United States Patent
Smague et al.

(10) Patent No.: US 11,162,455 B2
(45) Date of Patent: Nov. 2, 2021

(54) TURBOPUMP ASSEMBLY FOR A CLOSED CIRCUIT, PARTICULARLY OF THE RANKINE CYCLE TYPE, ASSOCIATED WITH AN INTERNAL-COMBUSTION ENGINE, IN PARTICULAR FOR A MOTOR VEHICLE

(71) Applicants: IFP Energies nouvelles, Rueil-Malmaison (FR); ENOGIA, Marseilles (FR)

(72) Inventors: Pascal Smague, Rueil-Malmaison (FR); Arthur Leroux, Marseilles (FR); Gabriel Henry, Saint-Cannat (FR); Norman Holaind, Aix en Provence (FR)

(73) Assignees: IFP ENERGIES NOUVELLES, Rueil-Malmaison (FR); ENOGIA, Marseilles (FR)

( * ) Notice: Subject to any disclaimer, the term of this patent is extended or adjusted under 35 U.S.C. 154(b) by 0 days.

(21) Appl. No.: 16/604,795

(22) PCT Filed: Apr. 12, 2018

(86) PCT No.: PCT/FR2018/000088
§ 371 (c)(1),
(2) Date: Oct. 11, 2019

(87) PCT Pub. No.: WO2018/189435
PCT Pub. Date: Oct. 18, 2018

(65) Prior Publication Data
US 2020/0124000 A1 Apr. 23, 2020

(30) Foreign Application Priority Data
Apr. 14, 2017 (FR) ..................... 17/53.271

(51) Int. Cl.
*F02G 5/02* (2006.01)
*F01K 23/14* (2006.01)
(Continued)

(52) U.S. Cl.
CPC ............... *F02G 5/02* (2013.01); *F01K 23/14* (2013.01); *F02B 39/085* (2013.01); *F02B 39/12* (2013.01)

(58) Field of Classification Search
CPC .......... F02G 5/02; F02B 39/12; F02B 39/085; F01K 23/14; F01K 23/10; F01K 23/065; Y02T 10/12
(Continued)

(56) References Cited

U.S. PATENT DOCUMENTS 3,888,084 A * 6/1975 Hawkins .................. F02G 5/00 60/614
7,181,912 B2 * 2/2007 Mori ....................... B60K 8/00 60/616
(Continued)

FOREIGN PATENT DOCUMENTS

| DE | 112013003440 T5 | 4/2015 |
| EP | 2762713 A1 | 8/2014 |
| WO | 2013/046885 A1 | 4/2013 |

OTHER PUBLICATIONS

International Search Report for PCT/FR2018/000088, dated Sep. 10, 2018; English translation submitted herewith (7 pgs.).

Primary Examiner — Hoang M Nguyen
(74) Attorney, Agent, or Firm — Fitch, Even, Tabin & Flannery, LLP

(57) ABSTRACT

The present invention relates to a kinetic turbopump assembly for a closed loop, in particular of Rankine cycle type, associated with an internal-combustion engine (12) with a drive shaft (26), notably for a motor vehicle, wherein one (10) of the faces of said engine carries accessories (14, 18,
(Continued)

22) of this engine, and at least one winding roller (30, 30', 30") for a rotary motion transmission belt (32) connecting at least said accessories to drive shaft (26).

According to the invention, the assembly comprises a rotary motion transmission path (T) between shaft (38) of the turbopump and said winding roller.

18 Claims, 1 Drawing Sheet

(51) Int. Cl.
*F02B 39/12* (2006.01)
*F02B 39/08* (2006.01)

(58) Field of Classification Search
USPC ............................... 60/670; 123/559.1, 559.3
See application file for complete search history.

(56) References Cited

U.S. PATENT DOCUMENTS

| | | | |
|---|---|---|---|
| 2006/0213218 A1* | 9/2006 | Uno | F25B 27/02 |
| | | | 62/467 |
| 2009/0277400 A1* | 11/2009 | Conry | F02G 5/04 |
| | | | 123/2 |
| 2010/0282221 A1* | 11/2010 | Le Lievre | F02B 39/12 |
| | | | 123/559.1 |
| 2012/0019010 A1* | 1/2012 | Nakamura | F01C 13/04 |
| | | | 290/1 R |
| 2014/0165567 A1 | 6/2014 | Nagai et al. | |
| 2015/0064039 A1* | 3/2015 | Nagai | F04C 29/005 |
| | | | 418/69 |
| 2015/0176482 A1 | 6/2015 | Haraguchi et al. | |
| 2015/0377077 A1 | 12/2015 | Laboe et al. | |

\* cited by examiner

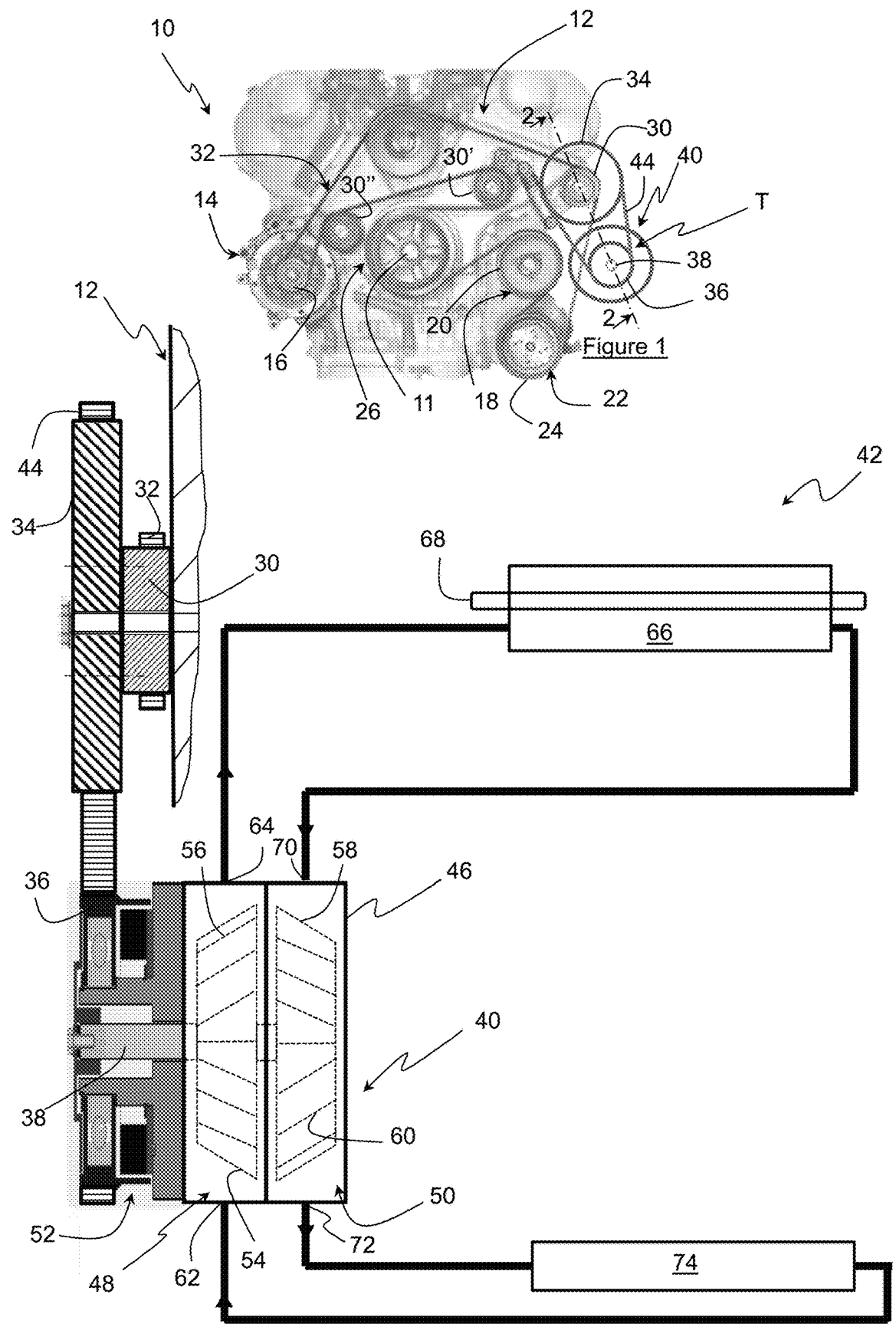

TURBOPUMP ASSEMBLY FOR A CLOSED CIRCUIT, PARTICULARLY OF THE RANKINE CYCLE TYPE, ASSOCIATED WITH AN INTERNAL-COMBUSTION ENGINE, IN PARTICULAR FOR A MOTOR VEHICLE

CROSS-REFERENCE TO RELATED APPLICATIONS

This application is a U.S. national phase application filed under 35 U.S.C. § 371 of International Application No. PCT/FR2018/000088, filed Apr. 12, 2018, designating the United States, which claims priority from French Patent Application No. 17/53.271, filed Apr. 14, 2017, which are hereby incorporated herein by reference in their entirety.

FIELD OF THE INVENTION

The present invention relates to a kinetic turbopump assembly for a closed loop, in particular of Rankine cycle type, associated with an internal-combustion engine, notably for a motor vehicle or for a heavy goods vehicle.

A kinetic turbopump is understood to be an assembly consisting of a pump and a turbine.

BACKGROUND OF THE INVENTION

According to a particular feature of the pump, its rotor carries a multiplicity of radial fins forming an impeller whose effect is to cause rotation and acceleration of the fluid in liquid state. Through the effect of the rotation of the pump impeller, the fluid is axially sucked, then radially accelerated and discharged through the volute which a turbopump is usually provided with. The turbine, which is connected to the pump on the same shaft, is made up of a stator part comprising a stationary vane assembly, referred to as diffuser, intended to convert the pressure of the fluid in vapour state to kinetic energy. This kinetic energy is subsequently converted to mechanical energy through a mobile vane assembly of the rotor part of the turbine. The vanes of the turbine consist of radial fins allowing expansion of the fluid that is discharged through the outlet volute of the turbine.

In the main configuration of the turbine, the vanes are preferably radial, but they may also have an axial profile.

As is widely known, a Rankine cycle is a thermodynamic cycle wherein heat coming from an external heat source is transmitted to a closed loop containing a working fluid. During the cycle, the working fluid undergoes phase changes (liquid/vapour).

This type of cycle is generally broken up into a stage where the working fluid used in liquid form is compressed in an isentropic manner, followed by a stage where this compressed liquid fluid is heated and vaporized on contact with a heat source.

This vapour is then expanded, in another stage, in an expansion machine, then, in a last stage, this expanded vapour is cooled and condensed on contact with a cold source.

To carry out these various stages, the loop comprises at least one pump for circulating and compressing the fluid in liquid form, an exchanger evaporator that is swept by a hot fluid for at least partial vaporization of the compressed fluid, an expansion machine for expanding the vapour, such as a turbine that converts the energy of this vapour into another energy such as electrical or mechanical energy, and an exchanger condenser by means of which the heat contained in the vapour is yielded to a cold source, generally outside air, or a cooling water circuit, that sweeps this condenser, so as to convert this vapour into a fluid in liquid form.

In this type of circuit, the fluid used is generally water, but other types of fluid, organic fluids or organic fluid mixtures for example, may also be used. The cycle is then referred to as Organic Rankine Cycle (ORC).

By way of example, the working fluids can be butane, ethanol, hydrofluorocarbons, ammonia, carbon dioxide, etc.

As is well known, the hot fluid for carrying out vaporization of the compressed fluid can come from various hot sources, such as a liquid coolant (from a combustion engine, an industrial process, a furnace, etc.), hot gases resulting from combustion (fumes from an industrial process, a boiler, exhaust gas from a combustion engine or a turbine, etc.), a heat flux from solar thermal collectors, etc.

Generally, and as described more in detail in document WO-2013/046,885, the pump and the turbine are combined to form a single piece, thus forming a small-size turbopump.

The shaft of this turbopump, which is common to the pump and the turbine, is coupled with the crankshaft of the internal-combustion engine, generally by a belt surrounding a pulley provided on this crankshaft and another pulley arranged on the turbopump shaft.

In order to be able to control the turbopump, an electromagnetic clutch is provided between the turbopump shaft and its pulley so as to uncouple this pulley from this shaft.

This arrangement, although satisfactory, involves some not insignificant drawbacks.

Indeed, the pump and the turbine need to operate at the same rotational speed representing a multiple of the speed of the engine shaft to which they are connected, this rotational speed depending on the ratio of the diameters of the drive pulleys of the crankshaft and of the turbopump selected.

The ratio being limited by the size of these pulleys on the engine, it conditions the typology of the compression and expansion machines that can be used in this turbopump design and makes it difficult in particular to use kinetic turbines mechanically coupled to a drive shaft requiring high operating speeds.

The present invention aims to overcome the aforementioned drawbacks by means of a control device allowing to use the Rankine cycle closed loop with its turbopump over the entire operating range thereof.

SUMMARY OF THE INVENTION

The present invention therefore relates to a kinetic turbopump assembly for a closed loop, in particular of Rankine cycle type, associated with an internal-combustion engine with a drive shaft, notably for a motor vehicle, wherein one of the faces of said engine carries accessories of this engine, and at least one winding roller for a rotary motion transmission belt connecting at least said accessories to the drive shaft, characterized in that the assembly comprises a rotary motion transmission path between the shaft of the turbopump and said winding roller.

The motion transmission path can comprise a pulley connected to the winding roller, a pulley carried by the shaft of the turbopump and a band closed on itself connecting the two pulleys.

The diameter of the pulley connected to the winding roller can be different from that of the pulley carried by the turbopump shaft.

The band closed on itself can comprise a belt.

The band closed on itself can comprise a chain.

The rotary motion transmission path can comprise a gear train.

The turbopump shaft can carry a controlled coupling with the pulley.

The controlled coupling can comprise an electromagnetic clutch.

BRIEF DESCRIPTION OF THE FIGURES

Other features and advantages of the invention will be clear from reading the description hereafter, given by way of non limitative example, with reference to the accompanying figures wherein:

FIG. 1 shows the accessories face of an internal-combustion engine with the turbopump, and FIG. 2 is a partial sectional view along line 2-2 of FIG. 1.

DETAILED DESCRIPTION OF THE INVENTION

FIG. 1 shows an internal-combustion engine 10, in particular for a motor vehicle, of private motor vehicle or heavy goods vehicle type, with a drive shaft 11. This engine comprises a face 12, referred to as accessories face, which generally carries part of the accessories necessary for the operation of this engine and/or this vehicle.

The system comprises two separate and different rotary motion transmission paths: a motion transmission belt 32 for driving the accessories and a second rotary motion transmission path 44, distinct from motion transmission belt 32, for dedicated and specific turbopump drive.

By way of example only, this accessories face carries an alternator 14 for powering the engine and/or the vehicle with an alternator pulley 16, a water pump 18 with a pulley 20 for the cooling system of this engine and an oil pump 22 provided with a pulley 24 for lubricating certain parts of this engine.

This accessories face also comprises a crankshaft pulley 26 that is rotationally connected to drive shaft 11 (or crankshaft) of this engine. This face also carries at least one winding roller, here three winding rollers 30, 30' and 30", mounted freely rotating on swivel pins attached to this face. These winding rollers are used in particular for guiding a rotary motion transmission belt 32.

This belt is connected to the various pulleys so as to allow the rotary motion of the crankshaft to be transmitted to these accessories.

This face also comprises a binding pulley 34 that is rotationally connected to winding roller 30 by any known means (such as screws shown by centerlines) for rotating a pulley 36 carried by shaft 38 of a turbopump 40 of a Rankine cycle type closed loop 42 (see FIG. 2) through a band closed on itself, such as a chain or a binding belt 44.

The turbopump is here a kinetic turbopump and it comprises a single housing 46 with a section containing, on shaft 38, a fluid circulation and compression means 48, referred to as pump, another section with a compressed fluid expansion means 50, referred to as turbine, also housed on shaft 38, and a controlled coupling 52, here an electromagnetic type clutch, carried by shaft 38 to control the coupling of pulley 36 with this shaft.

The pump comprises a pump rotor 54 carrying radially projecting fins 56 and the turbine also comprises a rotor 58 provided with radially projecting fins 60.

As can be seen more clearly in FIG. 1, the turbopump is connected to winding roller 30 by a rotary motion transmission path T that comprises pulleys 34 and 36, as well as belt 44.

Of course, this motion transmission path may comprise a gear train with a pinion fastened to the winding roller, another pinion fastened to the turbopump shaft and, if necessary, at least one intermediate pinion.

This turbopump is part of the Rankine cycle closed loop 42 that is advantageously of ORC (Organic Rankine Cycle) type and uses an organic working fluid or organic fluid mixtures, such as butane, ethanol, hydrofluorocarbons.

It is understood that the closed loop can also operate with a fluid such as ammonia, water, carbon dioxide, etc.

The turbopump section containing pump 48 is provided with an inlet 62 for the working fluid in liquid form and an outlet 64 for this working fluid also in liquid form, but compressed under a high pressure.

Outlet 64 of the pump is connected to a heat exchanger 66, referred to as evaporator, through which the compressed working fluid flows and by means of which the working fluid leaves this evaporator in form of compressed vapour.

The evaporator is also traversed by a hot source 68, in liquid or gaseous form so that it can yield its heat to the working fluid. This hot source can for example originate from the exhaust gas or from another heat source of internal-combustion engine 10.

The evaporator outlet is connected to inlet 70 of the turbopump section comprising turbine 60 so as to admit the working fluid in form of high-pressure compressed vapour, this fluid leaving the turbine through outlet 72 in form of low-pressure expanded vapour.

Outlet 72 of the turbine is connected to a cooling exchanger 74, or condenser, allowing to convert the low-pressure expanded vapour it receives to a low-pressure liquid fluid. This condenser is swept by a cold source, generally a stream of ambient air or of cooling water, in order to cool the expanded vapour so that it condenses and turns into a liquid.

Of course, the various elements of the loop are connected together by fluid circulation lines allowing them to be connected successively.

As described above, the assembly thus consisting of winding roller 30 and of the binding pulley makes up a double pulley supporting both the belt of the engine accessories and the belt dedicated to the turbopump.

In order to obtain the desired gear ratios between binding pulley 34 and turbopump pulley 36, the diameters of these pulleys just need to be parameterized to obtain these gear ratios.

By way of example and as illustrated in FIG. 1, the diameter of binding pulley 34 is substantially twice the diameter of turbopump pulley 36, which doubles the rotational speed of this pulley in relation to the binding pulley.

Such a configuration has many advantages:
- it allows to mechanically couple the turbopump of the closed loop to the engine without modifying the main accessories face, only by adding elements thereto, which simplifies the implementation in the engine, notably under retrofit conditions,
- it provides power transmission from the engine to the turbopump so as to set the pump of the closed loop in motion,
- it provides power transmission from the turbopump to the engine when the turbine produces more power than is consumed by the pump,
- it allows simple control of the turbopump with an operating speed imposed by the engine,
- it allows, through a series of two reduction stages in series, to achieve a high reduction ratio (6-10) between the turbopump and the engine so as to guarantee a sufficiently high operating speed for the kinetic turbopump to provide satisfactory turbine efficiency. Kinetic type turbines are characterized in that their losses are related, among other things, to internal leaks between the vanes and the wheel case. High speeds allow these internal leaks to be limited and are therefore favourable to turbine performance.

Thus, in one of the operating phases, the closed loop is not activated and the internal-combustion engine is operational. In this phase, the turbopump is not driven due to the released position of clutch 52 that disengages shaft 38 from pulley 36. Binding pulley 34 is rotated by winding roller 30 and this rotation is retransmitted to pulley 36 of the turbopump. Considering the released position of the clutch, this rotation of pulley 36 is transmitted neither to the pump nor to the turbine.

In the starting phase of the closed loop, the internal-combustion engine is operational and pump 48 of the turbopump requires priming. Shaft 38 is therefore coupled to pulley 36 of the turbopump by clutch 52. The rotary motion of winding roller 30 is transmitted to binding pulley 34, which transmits it in turn to the turbopump pulley through binding belt 44. This motion of pulley 34 is then retransmitted to the pump by shaft 38 which is coupled to pulley 36.

In one of the operating phases of the loop, the turbine produces energy which it transmits to the internal-combustion engine when this turbine produces more power than is consumed by the pump.

In this phase, the internal-combustion engine is still operational and shaft 38 is coupled to turbopump pulley 36 by clutch 52. The power generated by turbine 60 is transmitted to turbopump pulley 36, and subsequently, through belt 44, to binding pulley 34 which then transmits it to winding roller 30. The rotation of the winding roller is transmitted to the accessories by belt 32 and more particularly to crankshaft pulley 26, which provides a power increase to this crankshaft and, therefore, to the internal-combustion engine.

As soon as the transmitted power becomes insufficient, i.e. when the turbine produces less power than is consumed by the pump, the turbopump is made inoperative through opening of the clutch.

The present invention is not limited to the example described above and it encompasses any variant.

Thus, the controlled coupling can be arranged between winding roller 30 and binding pulley 34.

The invention claimed is:

1. A kinetic turbopump assembly for a closed loop, associated with an internal-combustion engine with a drive shaft, for a motor vehicle or a heavy goods vehicle, wherein one of the faces of the engine carries accessories of this engine, and at least one winding roller for a rotary motion transmission belt connecting at least the accessories to the drive shaft, the kinetic turbopump assembly comprising a kinetic turbopump, the kinetic turbopump comprising a turbopump shaft, a pump provided on the turbopump shaft and a turbine provided on the turbopump shaft, wherein the pump and the turbine are contained in a single housing, wherein the kinetic turbopump assembly further comprises a rotary motion transmission path between the turbopump shaft and the at least one winding roller, the rotary transmission path being distinct from the rotary motion transmission belt.

2. An assembly as claimed in claim 1, wherein the motion transmission path comprises a pulley connected to the at least one winding roller, a pulley carried by the turbopump shaft and a band closed on itself connecting the two pulleys.

3. An assembly as claimed in claim 2, wherein the diameter of pulley connected to the at least one winding roller is different from that of the pulley carried by the turbopump shaft.

4. An assembly as claimed in claim 2, wherein the band closed on itself comprises a belt.

5. An assembly as claimed in claim 2, wherein the band closed on itself comprises a chain.

6. An assembly as claimed in claim 1, wherein the rotary motion transmission path comprises a gear train.

7. An assembly as claimed in claim 2, wherein the turbopump shaft carries a controlled coupling with the pulley carried by the turbopump shaft.

8. An assembly as claimed in claim 7, wherein the controlled coupling comprises an electromagnetic clutch.

9. An assembly as claimed in claim 1, wherein the closed loop is a closed loop of a Rankine cycle.

10. An internal-combustion engine for a motor vehicle or a heavy goods vehicle, wherein one of the faces of the engine carries accessories of this engine, comprising a drive shaft, at least one winding roller for a rotary motion transmission belt connecting at least the accessories to the drive shaft, and a kinetic turbopump assembly comprising a turbopump shaft, a pump provided on the turbopump shaft and a turbine provided on the turbopump shaft, wherein the pump and the turbine are contained in a single housing, and a rotary motion transmission path between turbopump shaft and the at least one winding roller, the rotary transmission path being distinct from the rotary motion transmission belt.

11. An internal-combustion engine as claimed in claim 10, wherein the motion transmission path comprises a pulley connected to the at least one winding roller, a pulley carried by the turbopump shaft and a band closed on itself connecting the two pulleys.

12. An internal-combustion engine as claimed in claim 11, wherein the diameter of pulley connected to the at least one winding roller is different from that of the pulley carried by the turbopump shaft.

13. An internal-combustion engine as claimed in claim 11, wherein the band closed on itself comprises a belt.

14. An internal-combustion engine as claimed in claim 11, wherein the band closed on itself comprises a chain.

15. An internal-combustion engine as claimed in claim 10, wherein the rotary motion transmission path comprises a gear train.

16. An internal-combustion engine as claimed in claim 11, wherein the turbopump shaft carries a controlled coupling with the pulley carried by the turbopump shaft.

17. An internal-combustion engine as claimed in claim 16, wherein the controlled coupling comprises an electromagnetic clutch.

18. An internal-combustion engine as claimed in claim 10, wherein the closed loop is a closed loop of a Rankine cycle.

\* \* \* \* \*